United States Patent [19]

Hill

[11] Patent Number: 5,719,926
[45] Date of Patent: Feb. 17, 1998

[54] PREPAID LONG-DISTANCE TELEPHONE SERVICE SYSTEM WITH FLEXIBLE OPERATING PARAMETERS

[75] Inventor: Vincent F. Hill, Newberg, Oreg.

[73] Assignee: Communications Product Development, Inc., Vancouver, Wash.

[21] Appl. No.: 603,767

[22] Filed: Feb. 20, 1996

Related U.S. Application Data

[63] Continuation of Ser. No. 257,910, Jun. 10, 1994, abandoned.

[51] Int. Cl.⁶ ................ H04M 15/00; H04M 17/00; H04M 3/00
[52] U.S. Cl. .................. 379/113; 379/112; 379/114; 379/144; 379/197
[58] Field of Search ................. 379/91, 111, 112, 379/113, 114, 127, 142, 144, 189, 196, 197; 235/375, 379, 380, 382

[56] References Cited

U.S. PATENT DOCUMENTS

| | | | |
|---|---|---|---|
| 4,162,377 | 7/1979 | Mearns | 179/17 |
| 4,192,972 | 3/1980 | Bertoglio et al. | 179/6.3 |
| 4,326,123 | 4/1982 | Hosterman | 379/144 |
| 4,517,412 | 5/1985 | Newkirk | 379/144 |
| 4,706,275 | 11/1987 | Kamil | 379/154 |
| 4,746,786 | 5/1988 | Heberle | 379/144 |
| 4,769,834 | 9/1988 | Billinger | 379/112 |
| 4,849,615 | 7/1989 | Mollet | 235/380 |
| 4,879,746 | 11/1989 | Tasaki | 379/91 |
| 4,893,330 | 1/1990 | Franco | 379/91 |
| 4,907,257 | 3/1990 | Asano | 379/91 |
| 4,972,461 | 11/1990 | Brown | 379/91 |
| 5,068,891 | 11/1991 | Marshall | 379/144 |
| 5,101,098 | 3/1992 | Naito | 235/382 |
| 5,138,650 | 8/1992 | Stahl | 379/114 |
| 5,155,342 | 10/1992 | Urano | 235/380 |
| 5,163,086 | 11/1992 | Ahearn | 379/144 |
| 5,199,062 | 3/1993 | Von Meister | 379/196 |
| 5,266,782 | 11/1993 | Alanara | 379/91 |
| 5,353,335 | 10/1994 | D'Urso | 379/144 |
| 5,357,564 | 10/1994 | Gupta | 379/112 |

FOREIGN PATENT DOCUMENTS

| | | |
|---|---|---|
| 53-39808 | 9/1976 | Japan . |
| 57-127903 | 1/1981 | Japan . |
| 58-3367 | 6/1981 | Japan . |
| 1 544 542 | 4/1979 | United Kingdom . |
| A-2 046 556 | 11/1980 | United Kingdom . |
| A2-0 088 639 | 9/1983 | United Kingdom . |
| A-2 141 309 | 12/1984 | United Kingdom . |
| WO-A1-84/01073 | 3/1984 | WIPO . |
| WO-A1-87/02208 | 4/1987 | WIPO . |

OTHER PUBLICATIONS

National Applied Computer Technologies, "ATS III/65 Automated Long Distance Telephone Service User's Guide", Oct. 1983, Version 20.

American Telephone and Telegraph Company, "Notes on the BOC Intra-Lata Networks", 1980, 1983, p. 14.

*Primary Examiner*—Curtis Kuntz
*Assistant Examiner*—Vijay Shankar
*Attorney, Agent, or Firm*—Marger, Johnson, McCollom & Stolowitz, P.C.

[57] ABSTRACT

A long-distance telephone service system provides for accounting and flexible, customizable control of long-distance telephone usage by customers, especially prepaid long-distance service customers. The system maintains a set of global operating parameters associated with each access number. It further maintains a database of user accounts or card numbers, and a set of card processing parameters associated with each card number. Both the global parameters and the individual card processing parameters are applied in completing a long-distance call to a destination number so as to provide highly flexible control over individual accounts as well as groups of accounts. Establishment of new accounts, and "recharging" the prepaid balance of existing accounts is accomplished automatically from remote locations.

22 Claims, 6 Drawing Sheets

PREPAID LONG-DISTANCE TELEPHONE SERVICE SYSTEM WITH FLEXIBLE OPERATING PARAMETERS

This is a Continuation of application Ser. No. 08/257,910 filed Jun. 10, 1994, now abandoned.

BACKGROUND OF THE INVENTION

The present invention relates to long distance telephone services and more specifically, to flexible, customizable control of long distance telephone usage by customers, as well as methods and apparatus for issuing and/or recharging prepaid long distance telephone accounts from remote locations.

In a telephone network of the type prevalent in the United States, customer telephone lines are connected to a DCO (Digital Central Office) or simply "switch", which is an apparatus that completes the call to the destination number, preferably routing the call over the least-cost available long distance circuit. The DCO switch generates records of long distance usage for billing purposes. Specifically, at a conclusion of each long distance call, the switch generates a CDR, or call detail report, with information such as the calling number, the called number and the date and time and duration of the call. This CDR data is accumulated, for example, on a magnetic tape. The magnetic tapes are periodically removed to a billing office for processing to include the recorded calls on the customer bills. This is the telephone credit card type of system in that the telephone company is providing credit to the user in the sense that the user need not pay for the call until after it receives the bill, which may be several weeks thereafter.

More recently, prepaid or "debit card" systems are becoming increasingly popular. A prepaid long distance telephone sen, ice provider purchases long distance capacity from a long distance provider in volume, for example by leasing a number of lines. The prepaid service provider typically receives a cash payment from a customer in exchange for a specified amount of long distance telephone service, specified in dollar amount or minutes of long distance usage. The customer is given a card which indicates an access telephone number and an account number. Upon calling the access number, the customer is prompted to enter the account number and the destination number she wishes to call. The call is completed if a positive balance remains on the identified account. Additionally, that account balance is debited in real-time as the call progresses, and the call is terminated when the account balance is exhausted. This procedure reduces telephone fraud in that the charges cannot accumulate in excess of the amount prepaid by the customer.

The prepaid long distance telephone service is implemented by providing a digital switch at a central location accessible through the access telephone number. Known digital switches are limited in that only a limited set of operating parameters can be implemented and, a given set of operating parameters is applied to an entire trunk group of incoming telephone lines. Another problem with known debit card systems is that prepaid account cards must be distributed through point-of-sale locations such as retail drugstores where cash can be collected in payment for the cards. In general, the prepaid telephone service card is a cash equivalent because anyone having possession of the card can use it to the extent of the account balance. Once that balance is exhausted, the card is useless and may be discarded.

The need remains therefore to provide a way of "recharging" the balance of a prepaid long distance account as may be needed. There is a further need to provide a convenient means for distributing card accounts to new customers or recharging existing accounts at such times and places throughout the country as would maximize customer convenience. The need further remains for providing a long distance system that is extremely flexible in terms of implementing features and controls with respect to individual card accounts as well as group accounts, thereby allowing business users improved control over their long distance telephone costs and accounting. The need further remains to provide such a system at low cost and with very high reliability. U.S. Pat. No. 5,068,891 to Marshall discloses a credit control system for long distance telephone services. The Marshall patent teaches determining the amount of credit available to a telephone travel card holder at the completion of a long distance call and invalidating the card if no credit remains.

SUMMARY OF THE INVENTION

One aspect of the invention is a method for providing long-distance telephone services so as to implement a flexible variety of controls and features such as debiting a card account by minutes or by dollars; limiting card account usage by daily allowance, geographic area, audio message controls, number of retries, PIN key, etc. These features or controls are called operating parameters. The method calls for receiving a telephone call on an incoming access number; collecting dialed number identification service (DNIS) data to identify the access number called; retrieving a predetermined set of global operating parameters associated with the identified access number; collecting a destination telephone number from the user; and completing the call to the destination telephone number in accordance with the retrieved global operating parameters. In this way, the global operating parameters are selected in response to the called access number. This method allows automatic implementation of a corresponding set of global operating parameters for each available access number. In the past, telephone switches could be programmed only with respect to an entire trunk group.

The system also maintains a database of user accounts called card accounts. Each card account has a corresponding identification number, although a physical calling card need not necessarily be provided to the user. The inventive method further includes, in connection with processing a call, collecting a calling card number from the user and retrieving a set of card processing parameters associated with the collected card number from the database. The card processing parameters may include such things as a card type, project code digits, international calling permission, speed dial permission, domestic permission, etc. The card processing parameters generally include an account balance. After receiving answer supervision from the called number, the system updates the account balance in real time while the call is in progress, and otherwise effects the features and controls indicated by the corresponding card processing parameters. In this way, the system provides for automatic implementation of a corresponding set of processing parameters for each card number. The system implements the foregoing features in standard, readily available hardware thereby minimizing cost.

Another aspect of the invention includes methods and apparatus for distribution of card numbers (i.e. assignment of account numbers) to new telephone customers. Card numbers and access numbers can be distributed automatically to new customers at remote locations using the existing credit card charge clearing system to collect the required amount of money from a customer. Existing customers can augment or "refresh" their card account balances, again from a remote location in similar fashion.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Figure 1:
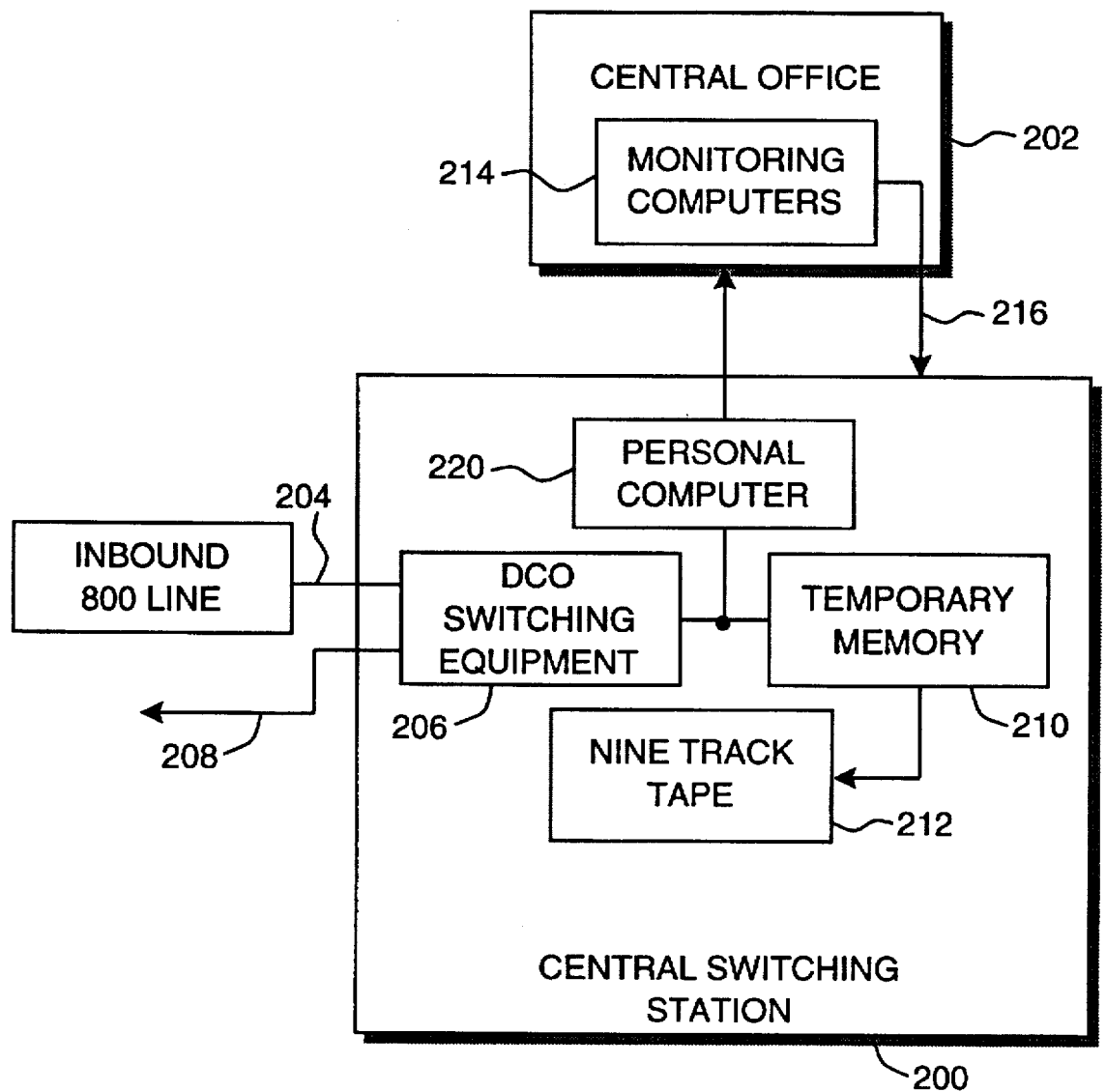
FIG. 1 illustrates a known system for credit control in a long-distance telephone service system.

In the prior art, telephone calls are received in a central switching station and from there routed, directly or indirectly, to the destination telephone number. The switching station accumulates completed call information which is used for billing the customer's account during the next billing cycle. FIG. 1 shows a prior art credit control system for long distance telephone services. Referring to FIG. 1, a first telephone line 204 for incoming calls and a second telephone line 208 for outgoing calls are coupled to a central switching station 200. The calls are routed through a DCO (Digital Central Office) switching equipment 206 which completes a call to the destination telephone number and, at the conclusion of a long distance call, prepares "call ticket data" which is stored in a temporary memory 210. The call ticket data is written from the temporary memory to a mass storage means such as a nine-track tape drive 212. Tapes containing call ticket data are periodically removed to a remote billing office (not shown) for billing the customers.

A central office 202 contains one or more monitoring computers 214 for maintaining customer account data. When a customers account is no longer available for additional long distance services, for example, when the amount owing on the account exceeds the credit limit, an invalidate signal is transmitted from the monitoring computers 214 over signal path 216 to the switching station 200. In response, the DCO switching equipment refuses to complete long distance calls from the calling telephone number associated with the subject account. According to U.S. Pat. No. 5,068,891 to Marshall, a personal computer 220 is provided at the switching station and coupled to the DCO switching equipment 206. The computer is configured with suitable software for capturing the call ticket data at the completion of a call. The personal computer 220 transmits the call ticket data to the monitoring computers 214 without delay. While this system helps to reduce telephone fraud losses in some cases, a single call can go on without limit, potentially for days, and far in excess of any available credit, because no data is captured until the call is completed voluntarily by the customer.

Figure 2:
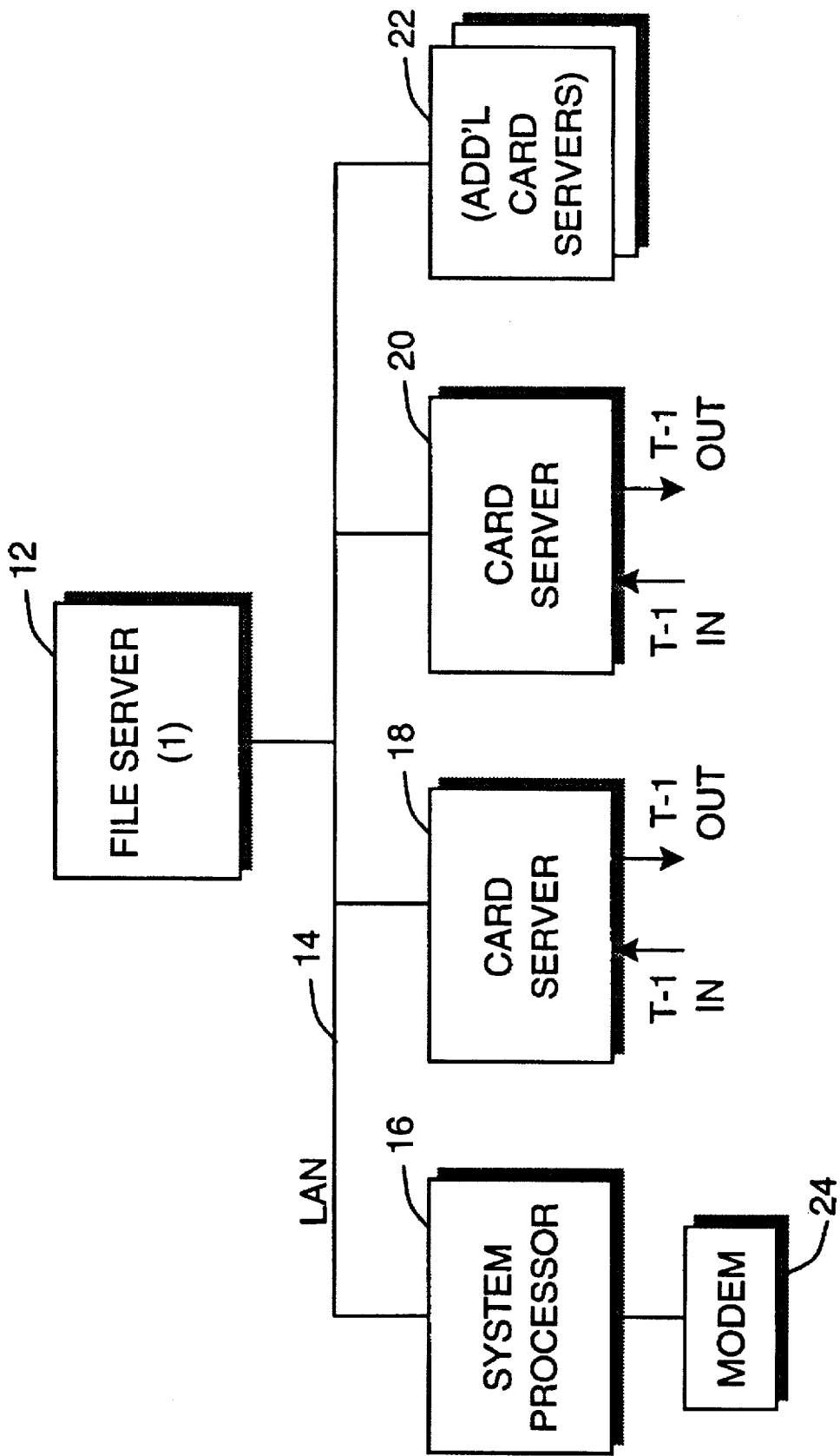
FIG. 2 is a block diagram of a long-distance telephone service system according to the present invention.

FIG. 2 is a block diagram of a long distance telephone service system 10 according to the present invention. The system 10 includes a plurality of digital components which preferably are interconnected by a network 14 such as a local area network (LAN). The system is controlled and programmed by an administration processor 16 coupled to the network 14. The administrative processor also is coupled to a modem 24 for remote operations further described below. A file server 12 is coupled to the network 14 for maintaining a database of information and making that information generally available over the network. The network further includes one or more card servers such as card servers 18 and 20. Additional card servers 22 may be added to the network as necessary to expand its capabilities for handling additional telephone lines and a corresponding increase in telephone call traffic. Each card server is coupled to a T-1 telephone line IN and T-1 telephone line OUT. T-1 refers to a high speed telephone line generally comprising two pairs of conductors and carrying 24 channels of information such as telephone calls. Thus, the system 10 can handle 24 simultaneous telephone calls on each card server on the network 14. The system 10 can be installed at any convenient location having access to the requisite telephone lines. In practice, a typical system 10 can be installed in a single room the size of a small office and it need not be attended except for certain maintenance and repair activities.

Figure 3A:
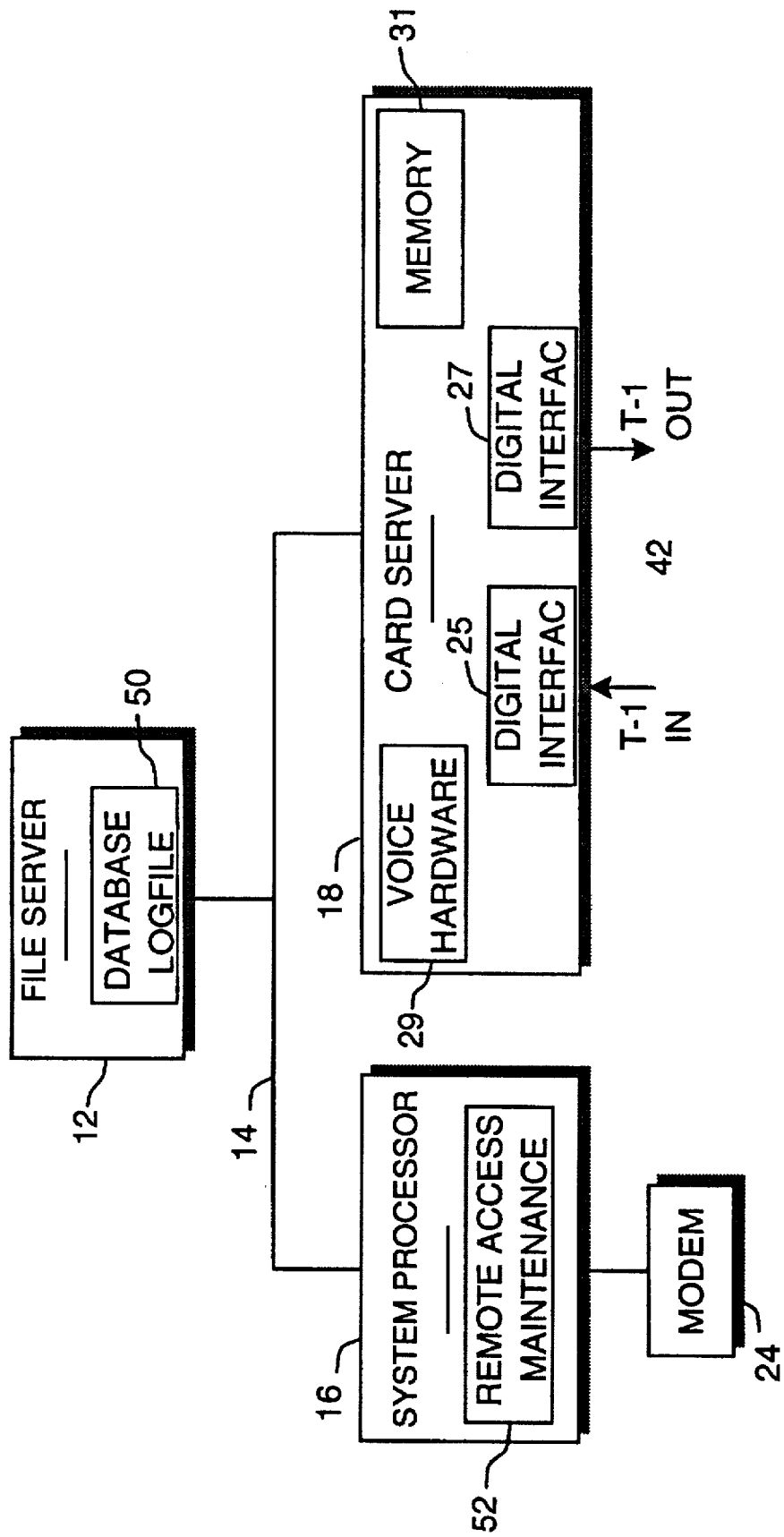
FIG. 3A is a block diagram illustrating an arrangement of software and hardware in the system of FIG. 2.

Referring now to FIG. 3A, the file server 12 preferably comprises a computer and may be implemented using, for example, a 486 DX type of microcomputer, preferably running at a minimum of 33 MHz clock rate and having at least 128K cache memory to provide fast operation. In one example of an operable system, the 486 file server machine is rack-mounted, industrial grade, having an 8-slot back plane, 16 MB of SIMM memory (expandable), a 250-watt power supply, 2–300 MB hard disk drives, one or more suitable floppy disk drives, a monitor and the usual accoutrements such as keyboard, serial and parallel I/O ports. A local area network (LAN) 14 may be implemented using, for example, Novell NetWare® software. The LAN software is arranged so that the file server and in particular, the hard disk drives or other mass storage media coupled to the file server machine are mounted as a network-wide resource so that other processors on the network can read from and write to the file server storage media as necessary. In particular, the file server maintains a database logfile 50, further described below, as a network resource.

Each of the card servers, for example card server 18, also comprises a computer coupled to the LAN. In one operative example of a commercial embodiment of the invention, a card server is implemented as a 486 DX microcomputer. The card server machine may be outfitted in much the same fashion as the file server machine 12 described above, with the following differences. First, the card processor has more modest storage requirements and thus may be outfitted with, for example, a single 128 MB hard drive although the exact size is not critical. As the cost per megabyte of storage continues to fall, it is anticipated that larger disk drives or functionally similar storage media having larger capacities may be used. The card server machine preferably is a rack mount, industrial grade configuration with a 14-slot back plane. The card server further includes a plurality of T-1 digital interface circuit boards 25,27. Each T-1 interface circuit board is used for coupling the card server machine to a T-1 telephone line. Thus, for a T-1 line IN and another T-1 line OUT, two interface circuit boards are required for each card server machine as illustrated in the figure. Suitable T-1 interface boards are commercially available, for example, from Dialogic Corp. of New Jersey, Model No. DTI/101.

Each card server 18 further includes voice processing means 29 for recording and playing audio messages as further described below. The voice processing means may be implemented using commercially available voice processing circuit boards such as Model D/121A available from Dialogic Corp. Multiple voice processing boards, for example three boards per card server machine, are preferred so as to allow playing audio messages on several telephone lines simultaneously without delay. Finally, each card server includes LAN adapters for coupling the card server to the local area network 14. Such adapters are commercially available, for example, the Intel EtherExpress 16.

The system processor 16 also comprises a computer such as a 386 or 486 class 33 MHz machine. A suitable configuration comprises an 8-slot upright housing with a 250-watt power supply, 4 MB of SIMM memory, 128 MB hard drive, IDE, high capacity floppy disk drives, VGA color monitor, VGA adaptor board, 101 keyboard, serial and parallel ports, etc. This type of commodity computer hardware is commercially available from many sources. Modem 24 may be, for example a 9600 baud Hayes compatible modem, also widely available from many sources. One of the advantages of the present invention is to offer new services and capabilities using off-the-shelf, relatively low-cost hardware.

Figure 3B:
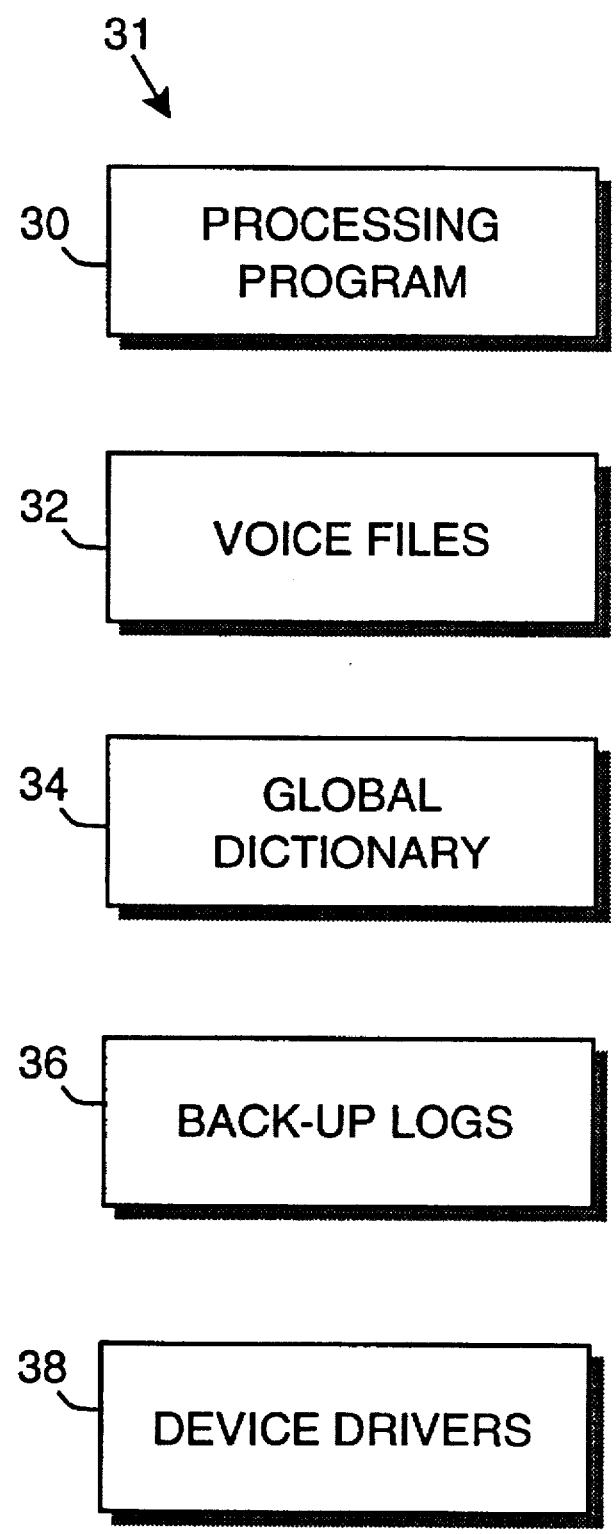
FIG. 3B illustrates program and data files stored in memory in the system illustrated in the foregoing figures.

The memory or storage means 31 in each card server includes a plurality of files. Referring now to FIG. 3B, these files include a processing program 30 which is further described below. Voice files 32 contain digital representation of various messages which are played as necessary through the voice hardware 29 so as to be audible to a caller. Examples of messages stored in the voice files include customer greetings; paid advertising on behalf of a local merchant; international warning message; prompt to enter customer account number; prompt to enter project code number; prompt to enter personal identification number; prompt to enter destination number; prompts to retry where collected data is inappropriate and the like.

The voice files with the voice hardware 29 and the processing program 30 together are arranged to provide information to the user in an audible form, based on information maintained or generated by the system 10. For example, these components may be arranged to announce to the user the balance remaining on the users account number (in dollars or minutes); balance on a particular project code account, etc.

The memory means 31 also includes a global dictionary file. The global dictionary file comprises a plurality of records, each of which corresponds to a particular telephone number called by the user. The incoming telephone number is collected by known DNIS techniques and is used as a key to select the corresponding global dictionary record. Each global dictionary record includes a plurality of fields or bits which are used to indicate one or more of the following parameters or processing flags:

TABLE 1

Global Parameters and Processing Flags

| Parameters and Flags | Comment |
| --- | --- |
| Warning times | the amount of time before termination of a call at which an audio warning message is played |
| Play balance | a flag whether or not to provide a current balance of the current customer account in audible form |
| Play goodbye | indicates whether or not to play a pre-determined audio message at the conclusion of a call |
| Play international warning | indicates whether or not to play a pre-recorded audio message to caution |

TABLE 1-continued

Global Parameters and Processing Flags

| Parameters and Flags | Comment |
| --- | --- |
| | the user that the called number is an international call |
| Minutes keylog path | points into the database logfile 50 in the file server machine for logging the call |
| Bad card path | indicates where processor is to write all bad card attempts |
| Brand voice path | a pointer into the voice files 32 for a particular language, for example, to provide audible messages in various languages as determined by the access number called |
| V&H billing | AT&T "type" billing; time of day, day of week, and distance sensitive, etc. |
| Time out on no answer | indicates the period of time without answer before terminating a long distance call |
| Reoriginate characters | selectable per DNIS can be 1–2 digits in combination selected by the customer |
| Number of retries | indicates the number of retries for collecting data such as an account number from the user before terminating the access call |
| PIN key | personal identification number key |
| Speed key | enables speed dialing capability |
| Redial key | enables automatic redial capability |
| Backup path | pointer into backup files maintained on the file server 12 for the corresponding access number |
| Play messages | enables/disables playing audio messages |

The memory means or storage means 31 also includes log files 36 for maintaining records of file backup activity.

Figure 4A:
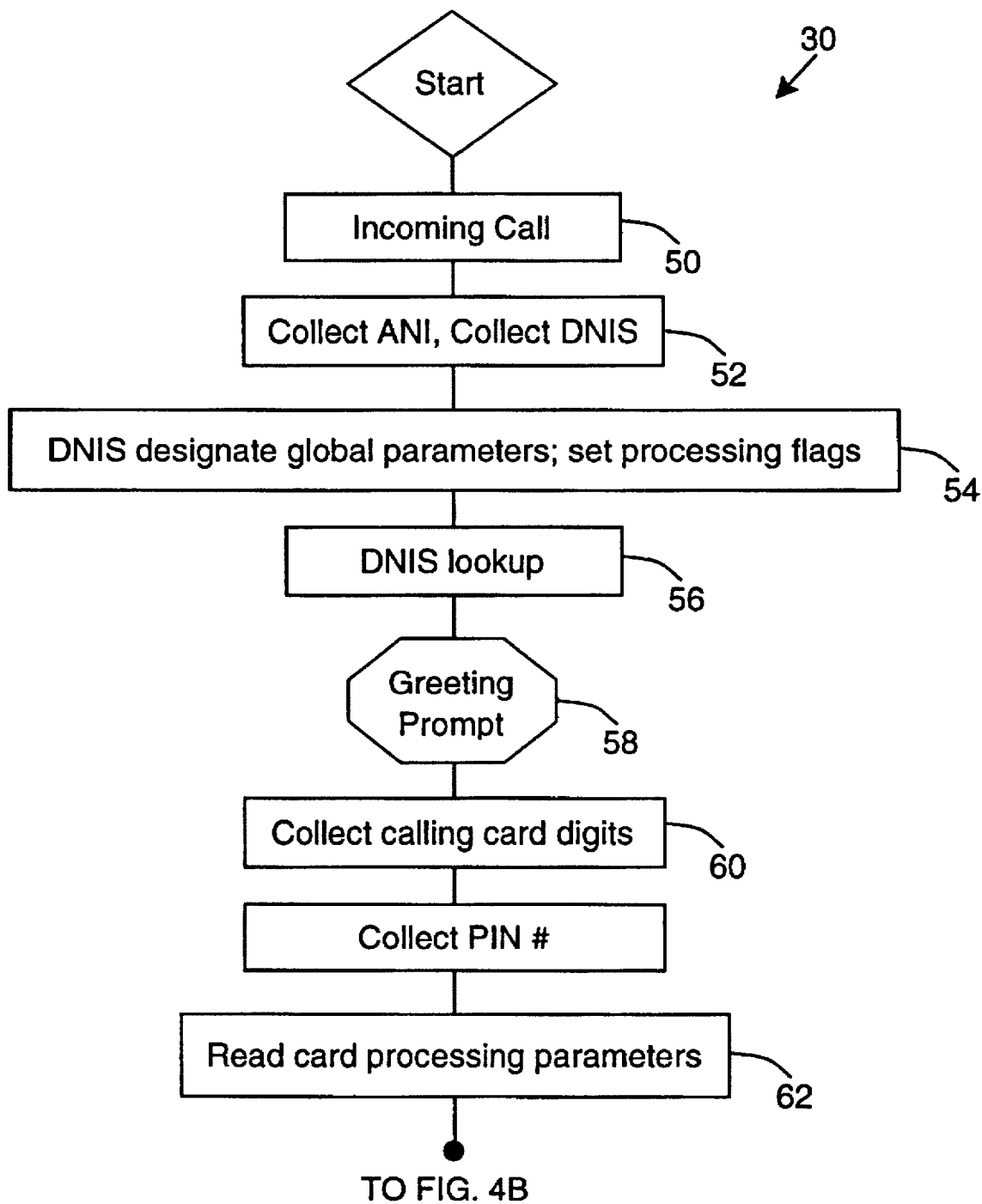
FIGS. 4A–4B form a flow chart of the call processing program of FIG. 3B.
Figure 4B:
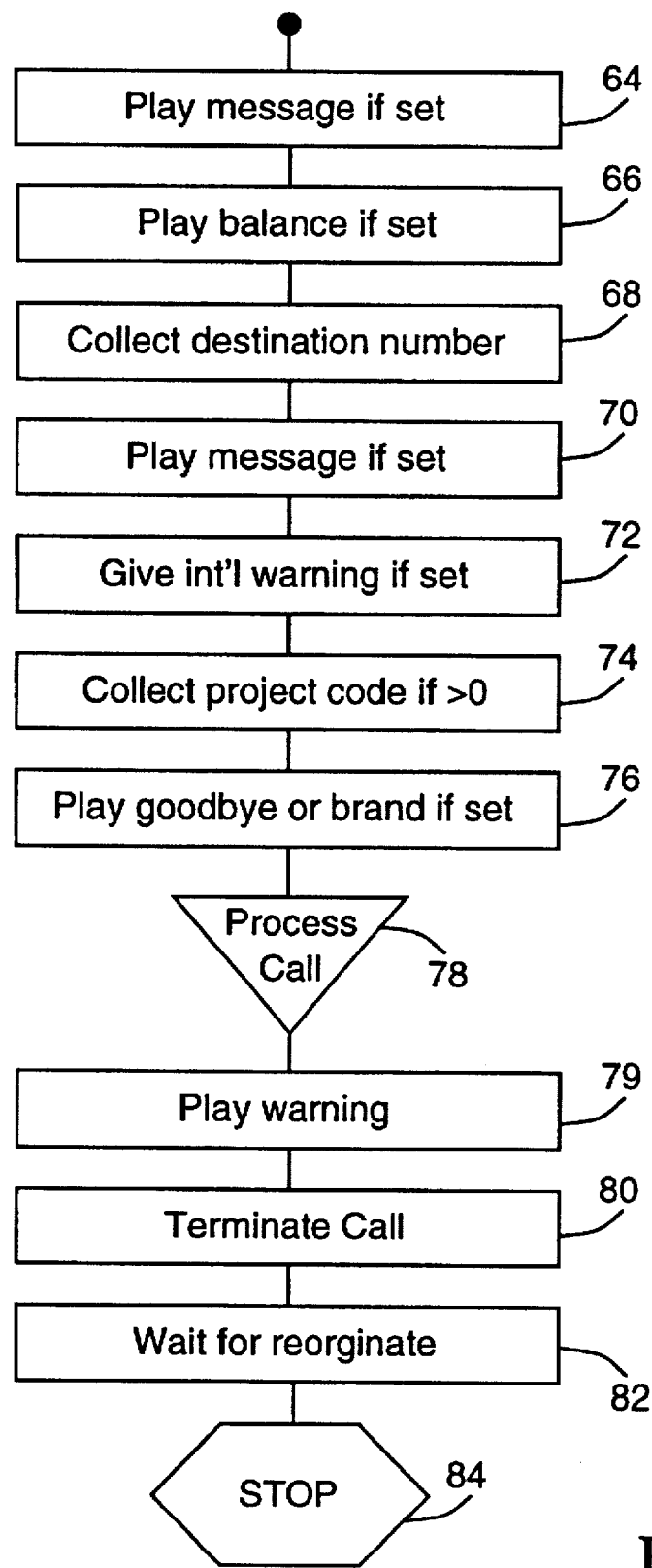

FIGS. 4A and 4B comprise a flowchart illustrating operation of the processing program 30. In general, the processing program is executed on each card server machine 18 and interacts with the corresponding memory 31, voice hardware 29 and digital interface circuits 25, 27 which in turn are coupled to the T-1 incoming and outgoing telephone lines, respectively. The program may execute a standby or idle loop until it detects an incoming call 50 on one of the access telephone numbers. In step 52 it collects automatic number identification (ANI) information which is the originating number of the user and collects DNIS information which identifies which access number the user called. In step 54, the DNIS information is used to designate global parameters and set processing flags such as those identified above in Table 1. In step 56, the DNIS look-up determines the information shown on the following Table 2.

TABLE 2

| Item | Comment |
| --- | --- |
| Card length | the number of characters in the user card number or account number |
| PIN length | indicates the number of characters of a personal identification number used for security |
| No. of speed dial digits | Self-explanatory, for example, two speed dial digits allows access to 100 stored telephone numbers 00–99 if active, program jumps to voice 'promotional' module for additional parameters |
| Voice promo | |
| Data path | defines location of data files for access |
| Callback | enables an automatic callback feature |

After the various parameters and processing flags are set, the program 30 proceeds to play an audible greeting prompt in step 58. The parameters and flags described above will determine the content of the greeting prompt, what language is used, and what information may be provided to the user. Next the system collects a calling card number from the caller. This step 60 may include prompts and provisions for retries. The program then reads card processing parameters in step 62 associated with the calling card account number. The card processor parameters may conveniently be stored in the file server machine 12 so that they are available to all the card server machines on the LAN 14. The individual card number processing parameters that may include by way of illustration those shown in the following Table:

TABLE 3

| Card Number Processing Parameters | |
| --- | --- |
| Card type: | debit card, credit card, disposable prepaid or rechargeable prepaid |
| Project code digits: | this number identifies the users account as part of a group of accounts under a predetermined project code for group cost accounting |
| International permission: | indicates whether or not this specific user account is permitted to make international calls on this system |
| Speed dial permission: | indicates whether or not speed dialing capability is permitted on this user account; a set of speed dial numbers may be maintained on the system for one or more accounts such as a project code group so that each user member of that group can conveniently use the speed dialing capability but every user may not have permission to edit or change the speed dial numbers |
| Domestic permission: | indicates whether or not domestic calls are allowed on this user account |
| Expiration date: | user account will be deemed invalid on this date and cannot be used thereafter; for example, in some cases a prepaid disposable calling card may be valid only for a limited period of time after the first call |
| Simultaneous usage: | indicates whether or not multiple calls may be processed simultaneously on this single user account |
| Rates to use: | provides an indication of a rate, for example, in cents per minute; multiple rates may be provided, for example a first rate for domestic calls and a second rate for international calls; moreover, the system can provide finer geographic resolution, if desired, since the phone number from which the caller is using has been collected through the ANI process |
| Public speed dial group: | permission to access a public speed dial group |
| Branding group: | allows replacement of the DNIS specified 'goodbye' message with message indicated by this card parameter |
| Balance: | this is the current balance on this user account |
| Usage days: | this field allows for limiting a given user account, for example to use on weekdays only; expanding this concept, the system could easily be configured to allow calling only on weekends or on any day except a holiday or any other arbitrary set of days, for example, if an account is established for a part-time salesperson who works only on Tuesdays and Thursdays, that could easily be indicated in that system so that the user account is operable only on Tuesdays and Thursdays; the particulars of maintaining and referencing a calendar in a computer are known. |

Turning now to FIG. 4B, the processing program next plays an audio message 64 as appropriate if set and further in step 66 plays the current balance if that flag is set. Steps 68 calls for collecting the destination telephone number. This refers to the number the user wishes to call. The particulars of collecting the number including voice prompts and retry are known. The appropriate messages may be played in step 70 if enabled. If geographic limitations are imposed on the user account, for example, step 70 may play an audio message that the collected destination number is not available on this account. Step 72 calls for playing an international warning if that ability is set. In step 74, this system collects a project code number if the project code number is greater than zero (see Table 3). Next, step 76, the system plays an audible progress message or brand message if set. For example, the system might play "Thank you for using Worldwide Long Distance Services" where "Worldwide" (fictional) is the name of a company that sells long distance telephone services to users and employs a system of the type disclosed herein for interfacing with the public telephone system so as to provide such services.

Step 78 calls for processing the requested call. Here, assuming that the requested call is permissible in view of the parameters described above, the processor uses an available line on one of the outgoing T-1 lines coupled to a card server, for example card server 18, through a digital interface 27 to complete the requested call. The duration of the call is monitored while the completed call is in progress. The system accrues time or charges according to the parameters noted above. The system automatically terminates the call, step 80, if and when the user account balance goes to zero, or if the call time or charge exceeds a predetermined single call limit. Next the system waits to see if the same user originates a second call, step 82. If the user originates a second call, the foregoing process is restarted beginning at step 66 by playing the current balance and proceeding with collecting the next destination number. If another call is not requested, the system enters a standby mode 84 to await a new incoming call.

It should be noted that the system described above can be built entirely of standard off-the-shelf hardware that is readily available at relatively modest cost. In the past, call processing generally required use of proprietary systems at much greater cost and with far more limited capabilities.

Referring once again to FIGS. 2 and 3, the system processor 16 is coupled to the LAN 14 and provides for communication with remote sites via the modem 24. The system processor includes software for maintenance operations of the overall system 10 and to provide remote access. Remote access may be used to query a current status of the system 10 or to collect statistical data concerning the systems usage, or even to query the current balance of individual or selected group of accounts. The remote access capability can also be used to add to or "recharge" individual customer accounts from a remote location.

Having illustrated and described the principles of my invention in a preferred embodiment thereof,. it should be readily apparent to those skilled in the art that the invention can be modified in arrangement and detail without departing from such principles. I claim all modifications coming within the spirit and scope of the accompanying claims.

I claim:

1. A method for providing long-distance service comprising:

establishing a plurality of different access phone numbers;

preselecting a plurality of different sets of global operating parameters, each preselected set corresponding to a respective one of the access phone numbers;

receiving a telephone call on one of said access phone numbers;

identifying the access phone number called to initiate the received telephone call;

retrieving fie preselected set of global operating parameters corresponding with the identified access phone number called;

collecting a destination telephone number;

completing the call to the destination telephone number in accordance with the retrieved preselected set of global operating parameters;

establishing a plurality of calling card numbers;

associating at least two of said calling card numbers with one of the different access phone numbers;

preselecting a plurality of different groups of processing parameters, each preselected group corresponding to a respective one of the calling card numbers;

collecting a credit card number;

identifying the credit card number collected;

retrieving the preselected group of processing parameters corresponding with the identified credit card number;

comparing the collected destination telephone number to the retrieved processing parameters; and processing the call to the destination telephone number in accordance with the retrieved processing parameters.

2. A method according to claim 1 wherein the retrieved set of global operating parameters include a selectable minutes key and the retrieved group of processing parameters including an account balance, the method further comprising:

providing a default cost per minute rate;

retrieving the account balance;

determining an estimated number of minutes remaining on the identified credit card number, said estimated number being equal to the account balance divided by the default cost per minute rate; and announcing the estimated number of minutes remaining if the minutes key is activated.

3. A method according to claim 1 wherein the retrieved global operating parameters include one or more message controls and further comprising playing one or more audio messages as indicated by the message controls.

4. A method according to claim 3 wherein said playing audio messages includes playing a first message for greeting or instructing the caller if indicated by the message controls.

5. A method according to claim 3 wherein said playing messages includes playing a second message comprising an international warning if indicated by the message controls and if the collected destination telephone number indicates an international call.

6. A method according to claim 3 wherein said playing audio messages includes playing a user-selectable information message if indicated by the message controls.

7. A method according to claim 3 wherein said playing audio messages includes playing a remaining amount of talk time based on destination and balance amounts if indicated by the message controls.

8. A method according to claim 3 wherein said playing audio messages includes playing an international charge rate if indicated by the message controls and if the collected destination telephone number indicates an international call.

9. A method according to claim 3 wherein said playing audio messages includes playing a predetermined brand announcement if indicated by the message controls, the brand announcement being associated with the identified access number.

10. A method according to claim 1 further comprising collecting a project code if indicated by the retrieved set of global operating parameters.

11. A method according to claim 1 wherein the retrieved global operating parameters include one or more of: a log path, a bad card path, a brand name, a voice path, V&H billing, a time out on no answer, reoriginate characters, number of retries, PIN key, speed key, redial key and a backup path.

12. A method according to claim 1 wherein the retrieved group of processing parameters including an account balance, the method further comprising decrementing the account balance in real time while the call is in progress.

13. A method according to claim 1 wherein the retrieved processing parameters include an account balance or a charge limit, the method further comprising:

computing a single call time or charge limit responsive to the retrieved account balance or charge limit and responsive to a predetermined destination rating;

while the completed call is in progress, substantially continuously comparing the call to the single call limit; and immediately terminating the call if and when the call time or charges meet the single call limit.

14. A method according to claim 13 wherein the retrieved global operating parameters include a specified warning time, and further comprising playing a predetermined warning message at the warning time prior to said terminating the call.

15. A method according to claim 1 wherein the processing parameters include an indication of card type, the method further comprising obtaining authorization to charge the long-distance telephone service to the collected calling card number if the card type is a credit card.

16. A method according to claim 1 wherein the card processing parameters include a project code identifier.

17. A method according to claim 1 wherein the card processing parameters include an indication of international calling permission, the method further comprising not completing the call if the destination telephone indicates an international call and the processing parameters indicate that international calling permission is denied.

18. A method according to claim 1 wherein the card processing parameters include an indication of speed dial permission, the method further comprising, if the processing parameters indicate that speed dialing is permitted, providing a speed dialing feature for use in connection with said collecting a destination telephone number, wherein said speed dialing feature includes providing access to a list of stored destination telephone numbers, each stored number being associated with a corresponding speed dialing code.

19. A method according to claim 1 wherein the card processing parameters include an indication of domestic calling area permission; and further comprising testing the destination telephone number against the domestic calling area and completing the call only if the destination telephone number is within the domestic calling area.

20. A method according to claim 1 wherein the card processing parameters include one or more of an indication of a card expiration date, a simultaneous usage rate, a public speed call group, a branding group and permitted usage days.

21. A system for connection to an incoming telephone line in front of a digital central office (DCO) switch to provide long-distance telephone services, the system comprising:

interface means for sending and collecting data over the telephone line;

a global dictionary for storing and retrieving a plurality of different sets of global operating parameters;

an access number dictionary for storing and retrieving a plurality of access numbers, each of said access numbers corresponding to a respective set of global operating parameters; and computing means coupled to the interface means, the access number dictionary and the global dictionary and arranged to collect dialed number identification service (DNIS) data through the interface means with respect to an incoming call and further arranged to retrieve a corresponding set of global operating parameters from the dictionary responsive to the collected DNIS data, whereby the set of global operating parameters are selected in response to the incoming telephone number; and the computing means further including means for processing a call received on the telephone line in accordance with the said of global operating parameters, thereby allowing automatic implementation of a corresponding set of global operating parameters for each and every available incoming line number.

22. A system according to claim 21 further comprising voice files in the computing means for forming and sending messages through the interface means under control of the program and the global operating parameters.

* * * * *